United States Patent [19]
Scott

[11] Patent Number: 5,479,480
[45] Date of Patent: Dec. 26, 1995

[54] DUAL MODE CELLULAR MODEM

[75] Inventor: Robert E. Scott, Indian Rocks Beach, Fla.

[73] Assignee: AT&T Corp., Murry Hill, N.J.

[21] Appl. No.: 175,449

[22] Filed: Dec. 30, 1993

[51] Int. Cl.⁶ .................................................. H04M 11/00
[52] U.S. Cl. ........................... 379/59; 455/33.1; 375/216; 375/222
[58] Field of Search .................................. 455/33.1, 33.2; 375/5, 8, 216, 222, 223; 379/59

[56] References Cited

U.S. PATENT DOCUMENTS

| | | | |
|---|---|---|---|
| 4,355,401 | 10/1982 | Ikoma et al. | 375/5 |
| 4,912,756 | 3/1990 | Hop | 375/5 |
| 5,134,611 | 7/1992 | Steinka et al. | 375/5 |

OTHER PUBLICATIONS

"A Modem/Codec for Cellular Telephony"; Lakshmikumar et al. 1993 IEEE International Solid-State Circuits Conference; pp. 148–149.

"Trends in Cellular & Cordless Communications" *IEEE Communications Mag.*, Jun. 1991; Goodman; pp. 31–40.

*Primary Examiner*—Reinhard J. Eisenzopf
*Assistant Examiner*—Andrew Faile
*Attorney, Agent, or Firm*—Joseph J. Opalach

[57] ABSTRACT

A mobile phone includes a modem, hereinafter referred to as a cellular radio modem. This cellular radio modem supports two modes of operation—an analog mode, where the cellular radio modem provides an analog signal for transmission; and a digital mode, where the cellular radio modem provides a digital bit stream for transmission. During operation, i.e., the existence of a data connection to a far-end modem, the cellular radio modem is alerted by the cellular network to switch to the appropriate mode—analog or digital. The cellular radio modem then switches and continues transmission in the new mode. In this embodiment, the far-end modem is part of a modem-pool located within the Mobile Telecommunications Switching Office of the cellular network. The far-end modem automatically detects this switch by the cellular radio modem and itself switches to the appropriate mode. This allows a mobile data user to transparently move between the analog mode and the digital mode without disconnecting a preexisting data connection.

12 Claims, 4 Drawing Sheets

DUAL MODE CELLULAR MODEM

BACKGROUND OF THE INVENTION

The present invention relates to data communications and, more particularly, to mobile data communications.

Today, the North American cellular system is an analog system, sometimes referred to as AMPS (Advanced Mobile Phone Service). The AMPS system has been standardized in a number of Telecommunications Industry Association (TIA) standards, e.g., TR-45.1, and is based upon analog frequency modulation (FM) technology. Each cellular radio channel is a cellular carrier that is frequency modulated by one voice signal. The bandwidth of each cellular radio channel is 30 kilo Hertz (kHz).

However, the current rapid growth of cellular voice communications is straining the existing AMPS system because of the AMPS limitation of carrying only one voice signal per cellular radio channel. As a result, the telecommunications industry is looking into different approaches that that will make the limited radio frequency (RF) spectrum currently allocated to cellular systems more efficient. Although there is an interim analog-based proposal termed Narrowband AMPS (NAMPS), those in the art generally view any long-term solutions as being based upon digital transmission concepts.

One digital system is based upon time division multiple access (TDMA) techniques and is defined in TIA interim standard (IS)-54. Generally speaking, in this TDMA approach each cellular radio channel now carries three digital voice channels, where each voice channel is assigned to a separate time slot within the 30 kHz RF channel to handle different conversations. The raw data rate is 13 K bits per second for each time slot. The digital bit streams, which represent voice signals, are encoded (compressed), interleaved, and transmitted over the air using a digital modulation scheme called quadrature phase-shift-keying (DQPSK). The combination of digital modulation, error-correcting codes, and time-slot interleaving, reduces the effects of the most common radio propagation impairments. This, in turn, triples the voice channel capacity without requiring additional RF-spectrum, increases subscriber capacity, and makes the limited RF spectrum currently allocated to cellular systems more efficient.

Another digital approach is the code-division multiple access (CDMA) approach defined in TIA standard IS-95 that uses spread-spectrum technology. However, whatever digital approach is eventually adopted, the next-generation cellular system, e.g., as defined in TIA standard IS-54, will be a "dual-mode" system that supports both existing AMPS mobile phones and the new digital cellular access equipment. This dual mode approach provides current mobile phone users, and cellular service providers, with a migration path to the new digital cellular technology. As a result, new mobile phones will be designed to support both analog-based AMPS technology and the digital, e.g., TDMA, technology. In addition, dual-mode mobile phones will receive signaling from the cellular network as to whether or not to switch between the analog mode and the digital mode during the existence of a voice conversation. This allows a cellular user to move from an AMPS-based cell to a digital-based cell without interruption of an existing voice conversation.

Although the primary market of cellular communications is voice communications, a growing part of the cellular market is made up of users who desire to communicate data through the cellular system. Although there are several methods for passing data over analog cellular, the primary method used today is where a data communications equipment (DCE), e.g., a modem, couples data terminal equipment (DTE), e.g., a lap-top personal computer, to a mobile phone through an RJ11 adapter. While the modem modulates the data signal from the lap-top computer to, typically, a quadrature amplitude modulated (QAM) signal, the RJ11 adapter couples the modem's QAM signal to the mobile phone over the mobile phone's local signaling interface, which is usually proprietary. The mobile phone modulates the modem's QAM signal onto the cellular carder, which is transmitted to a cell site transceiver. The latter demodulates the cellular carder and provides a received version of the QAM signal to a Mobile Telecommunications Switching Office (MTSO) of the cellular network for transmission to the public switched telephone network (PSTN) and a far-end data endpoint. This sets up an end-to-end data communications link between the cellular data endpoint and the far-end data endpoint. The modems of each endpoint usually have a specialized protocol that provides for better operation over the adverse cellular link, e.g., ETC (TM symbol) (Enhanced Throughput Cellular).

In migrating to the digital cellular technology, the approach to passing data over cellular is different from the above-mentioned analog-based approach. In particular, the mobile phone directly couples to any DTE via a standard DTE/DCE interface like Electronic Industries Association (EIA) RS-232. This DTE/DCE interface directly provides the data in a digital form to the mobile phone. Consequently, no equivalent interface adapter, like an RJ11 adapter in the analog-based method, is necessary to pass data over a digital cellular system.

Unfortunately, although the above-mentioned "dual-mode" operation of the next generation cellular system allows a mobile phone to switch between the analog mode and the digital mode during the course of a voice call, such switching during the course of a data call drops the data connection. In particular, the dual-mode mobile phone expects data in a digital bit stream, e.g., from a DTE coupled to the mobile phone's RS-232 port. For example, when switching from the analog mode to the digital mode the mobile phone must compress the analog signal. When this analog signal represents data, e.g., a QAM-modulated signal, these voice compression algorithms distort the analog data signal to a point where the data connection is severely impaired and subsequently dropped. As a result, a cellular data connection must remain in either analog mode, or digital mode, for the duration of the data call.

SUMMARY OF THE INVENTION

I have discovered a method and apparatus that allows a cellular data user to move between analog mode and digital mode without substantially interfering with an existing data connection. In one example, a cellular modem dynamically switches between an analog mode and a digital mode of operation.

In an embodiment of the invention, a mobile phone includes a modem, hereinafter referred to as a cellular radio modem. This cellular radio modem supports two modes of operation—an analog mode, where the cellular radio modem provides an analog signal for transmission; and a digital mode, where the cellular radio modem provides a digital bit stream for transmission. During operation, i.e., the existence of a data connection to a far-end modem, the cellular radio modem is alerted by the cellular network to switch to the appropriate mode—analog or digital. The cellular radio modem then switches and begins transmission in the appropriate mode. In this embodiment, the far-end modem is part of a modem-pool located within the MTSO. The modem pool modem automatically detects this switch by the cellular radio modem and also switches to the appropriate mode. This allows a mobile data user to transparently move between the analog mode and the digital mode without disconnecting a preexisting data connection.

BRIEF DESCRIPTION OF THE DRAWING

FIG. 5 is a block diagram of the cellular radio modem of FIG. 3;

DETAILED DESCRIPTION

Figure 1:
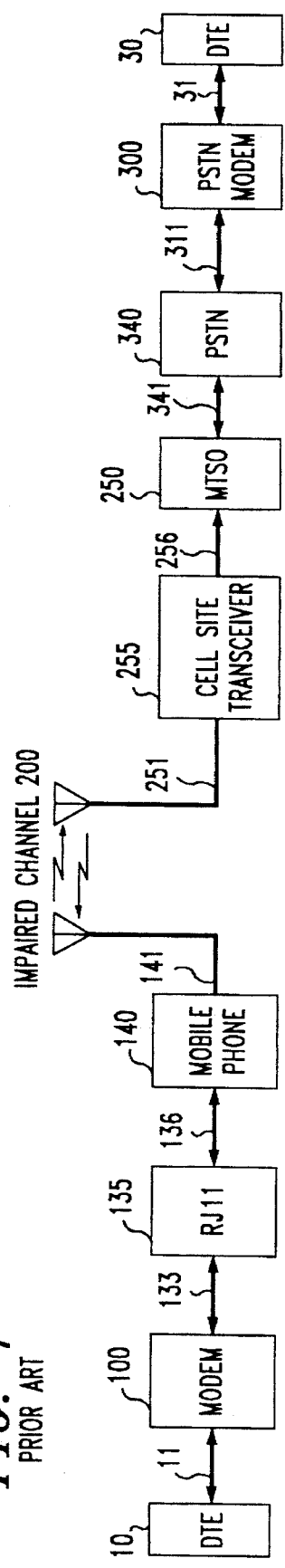
FIG. 1 is a block diagram of a prior art analog-based mobile data communications system.

FIG. 1 shows a block diagram of a prior art analog-based mobile data communications system. As shown, DTE 10 provides data to, and receives data from, modem 100 via line 11, which conforms to a DTE/DCE interface standard like EIA RS-232. Line 11 represents the signaling, electronics, and wiring, for conforming to EIA RS-232. As mentioned earlier, modem 100 modulates the data signal from DTE 10 to, typically, a quadrature amplitude modulated (QAM) signal, which is provided as a signal via line 133 to RJ11 adapter 135. The latter couples the modem's QAM signal to mobile phone 140 via the mobile phone's local signaling interface, which is represented by line 136. The cellular transceiver of mobile phone 140 (not shown) further modulates the modem's QAM signal onto the cellular carrier, which is transmitted to cell site transceiver 255. The latter demodulates the received cellular signal to provide a received version of the QAM signal to MTSO 250. The cellular communications channel is represented by impaired channel 200. The MTSO provides the received QAM signal to public switched telephone network (PSTN) 340, via PSTN facility 341, for transmission to a far-end data endpoint that is represented by PSTN modem 300 and DTE 30. This sets up an end-to-end data communications link between the cellular data endpoint, DTE 10 and modem 100, and the far-end data endpoint. The modems of each endpoint usually have a specialized protocol that provides for better operation over the adverse cellular link, e.g., ETC.

Figure 2:
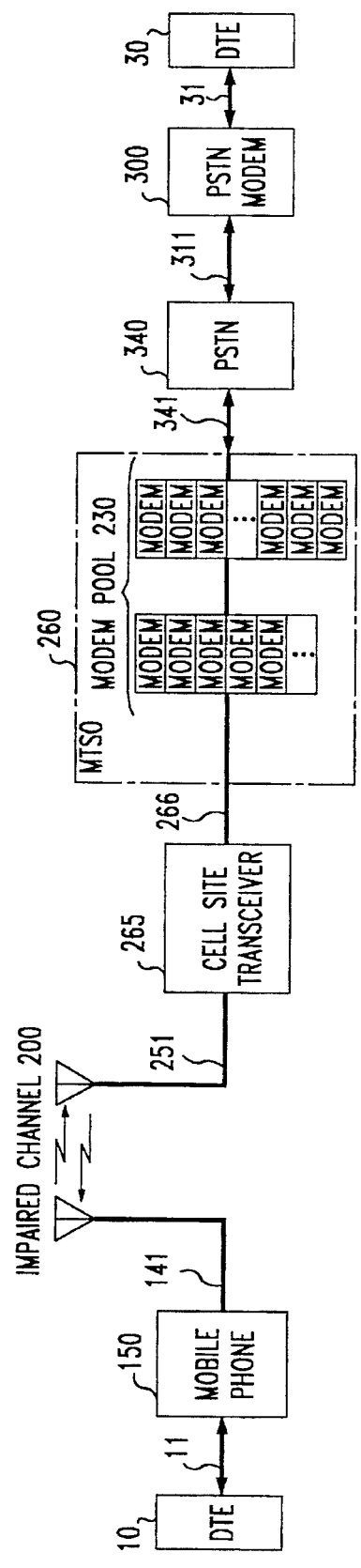
FIG. 2 is a block diagram of a prior art digital-based mobile data communications system.

In contrast, a prior an digital-based mobile data communications system is shown in FIG. 2. Here, mobile phone 150 directly connects to DTE 10 via line 11, which conforms to the above-mentioned EIA RS-232 interface. As a result, the data signal from DTE 10 is already in a digital form for use by digital-based mobile phone 150. This requires mobile phone 150 to provide direct support of data communications, e.g., implementing the radio link protocol (RLP). The Radio Link Protocol (RLP) is the industry name for the protocol used in providing data over digital cellular. In addition, as defined in the above mentioned TIA standards, data over digital cellular requires a modem pool in the MTSO to interwork with the PSTN. Consequently, MTSO 260 now includes "modem pool" 230. The modem pool provides two termination points—one for the cellular portion of the data connection and another one for the PSTN portion of the data connection.

As noted above, the next generation cellular system requires a "dual-mode" mobile phone that switches between an analog mode and a digital mode during the course of a voice conversation. Unfortunately, such switching during the course of a data call drops the data connection. Therefore, and in accordance with the invention, I have discovered a method and apparatus that allows a cellular data user to move between analog mode and digital mode without substantially interfering with an existing data connection. In particular, a cellular modem dynamically switches between an analog mode and a digital mode of operation.

Figure 3:
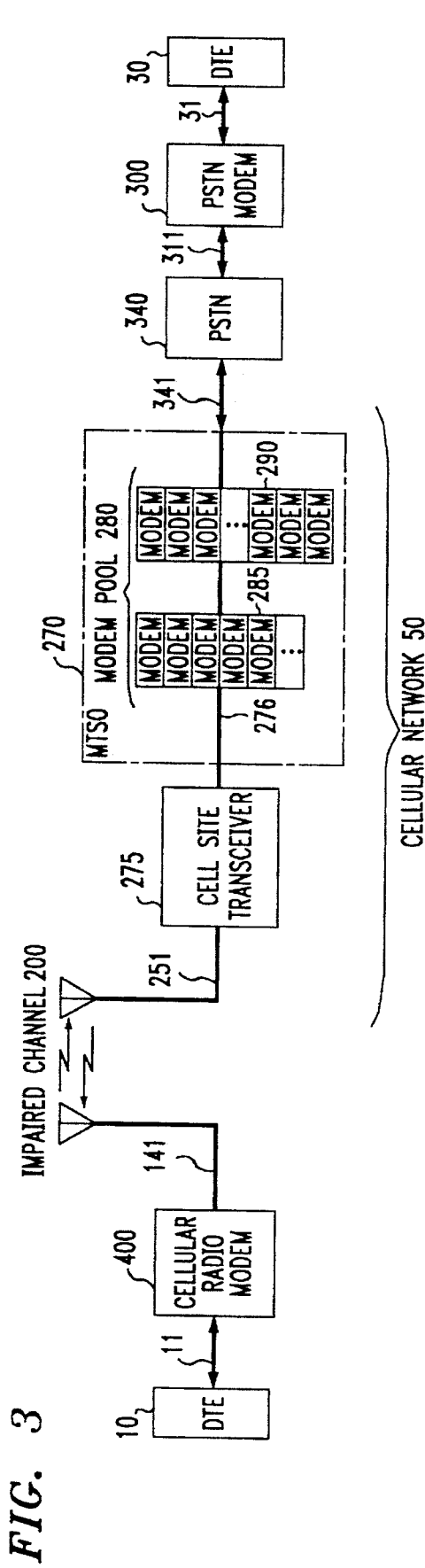
FIG. 3 is a block diagram of a mobile data communications system that includes a cellular radio modem embodying the principles of the invention.

A mobile data communications system embodying the principles of the invention is shown in FIG. 3. As shown in FIG. 3, a mobile phone includes a modem, hereinafter referred to as cellular radio modem 400. For voice conversations, the latter conforms to the above-mentioned standard IS-54, i.e., cellular radio modem 400 is a dual-mode phone. DTE 10 is coupled to cellular radio modem 400 via line 11, which conforms to the above-mentioned EIA RS-232 interface. For transmission of data from DTE 10, cellular radio modem 400 either provides an analog signal, e.g., a QAM signal, or a digital bit stream, for transmission to cellular network 50. The latter includes antenna 251, cell site transceiver 275, and MTSO 270, which includes modem pool 280. The modem pool allows a cellular-specific protocol, e.g., ETC, to be used over the cellular link, i.e., between cellular radio modem 400 and modem 285; while a standard protocol like Telephone and Telegraph Consultative Committee (CCITT) V.32bis can be used for the PSTN portion of the data connection between modem 290 and PSTN modem 300. Thus, only the mobile modem needs be cellular-specific modulation while the remote PSTN modem can be a standard modulation. The mobile data user can thus call any PSTN modem and operate satisfactorily. For the purposes of the following description, it is assumed that cellular radio modem 400 and modem-pool modem 285 are similar in design, i.e., they both embody the inventive concept (described below). Note however that other than for the inventive concept, modem-pool modem 285, as known in the art, receives a digital bit stream on line 276. This digital bit stream can be either a digitized analog signal (like PCM or ADPCM), or data.

Figure 4:
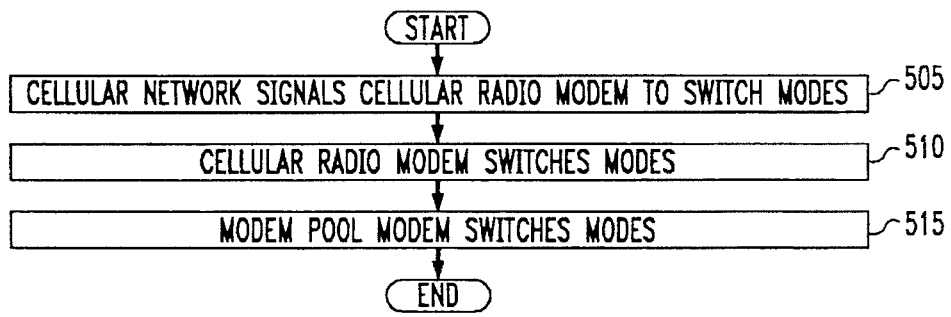
FIG. 4 is a flow diagram of an illustrative method for switching modes for use in the mobile data communications system of FIG. 3.

FIG. 4 shows an illustrative method used herein for providing a dual-mode data function in the mobile data communications system of FIG. 3 during the existence of a cellular data connection. It is assumed that in initially establishing the data connection, cell site transceiver 275 discriminates between a voice call and a data call. For example, if a voice call is in progress, any voice compression/decompression algorithms are enabled, while if a data call is in progress, these algorithms are disabled within cell site transceiver 275. In step 505, cellular network 50 signals cellular radio modem 400 to enter digital or analog mode. In the digital mode, this signaling is a pan of the digital bit stream, e.g., if the above-mentioned TDMA approach is used there are additional signaling bits in each time slot. In the analog mode, this signaling is by a "blank and burst" operation. In blank and burst, the communications are actually interrupted for a brief period of time during which signaling information is passed between the cellular transceiver and the mobile unit. Whether cellular network 50 signals cellular radio modem 400 to switch to a particular mode will depend upon a number of factors. For example, the cell where cellular radio modem 400 is located may have a limited number of analog and digital cellular radio channels. If an analog-only mobile phone requests a channel and cellular radio modem 400 was initially on an analog cellular radio channel, cellular network 50 may switch cellular radio modem 400 to a digital cellular channel to release the analog channel for use by the analog-only mobile phone. Or, cellular radio modem 400 may simply move to a new cell that requires cellular radio modem 400 to switch between modes. After receiving notification to switch modes, cellular radio modem 400 switches modes in step 510. As a result, the modem-pool modem switches modes in step 515 by automatically detecting the switch in modes by cellular radio modem 400, as described below.

A block diagram of cellular radio modem 400 is shown in FIG. 5. The components of cellular radio modem 400, other than the inventive concept, are well-known and will not be described in detail. Cellular radio modem 400 includes control processor 405, digital signal processor (DSP) 410, digital-to-analog and analog-to-digital (D/A, A/D) converter 420, and radio 160. The latter is a simple cellular transceiver under the control of control processor 405 (described below). The voice-portion of cellular radio modem 400 is not shown. Control processor 405 receives data from, and provides data to, DTE 10 via line 11, which conforms to EIA RS-232. Control processor 405 controls the formatting of the data signal received from DTE 10 in either one of two ways depending upon the mode of the mobile data connection. In analog mode, an analog signal is provided for transmission on line 421 and control processor 405 implements protocols like CCITT V.42bis; while in digital mode, a digital bit stream is provided for transmission on line 424 and control processor 405 implements the above-mentioned RLP protocol. DSP processor 410 provides the actual modulation while in the analog mode, i.e., an analog modem, and in the digital mode implements other portions of the RLP protocol like forward error correction (FEC). Complementary functions are performed when receiving data for transmission to DTE 10.

As shown in FIG. 5, radio 160 is coupled to control processor 405, DSP processor 410, and D/A-A/D 420, via line 401, which represents a number of data and control paths that are divided for simplicity into three signaling groups. Transmit and receive analog signaling, e.g., the above-mentioned QAM signals, is conveyed by line 421, hereinafter referred to as analog bus 421. Transmit and receive digital signaling, i.e., a digital bit stream, is represented by the signals conveyed by line 424, hereinafter referred to as the digital bus. As shown in FIG. 5, this digital bus includes at least three signals: TXD (transmit data), RXD (receive data), and a CLK (clock) signal. Finally, control signaling is represented by the signals conveyed by line 423, hereinafter referred to as control bus 423. Control processor 405 directs radio 160 via control bus 423 to select either the analog bus or the digital bus for transmission, and reception, of information from cellular network 50.

Figure 6:
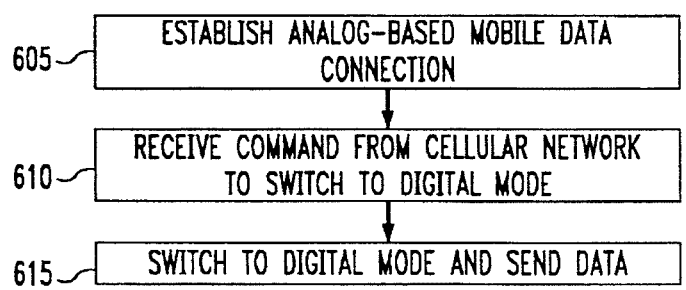
FIG. 6 is a flow diagram of an illustrative method for switching from analog to digital mode for use in the cellular radio modem of FIG. 5.

As this point, reference should now be made to FIG. 6, which represents an illustrative method used herein for providing a dual-mode function in cellular radio modem 400. It is assumed that an initial mobile data connection is established in analog mode in step 605. This allows a mobile data user at DTE 10 to transmit data to, and receive data from, the far-end data endpoint, DTE 30, while located in an analog-based cell, i.e., a cell that requires analog-based mobile communications. This data connection includes modem-pool modems 285 and 290. When the mobile data user moves from the analog-based cell to a digital-based cell, cellular radio modem 400 is notified to switch to digital mode in conformance with the above-mentioned standard IS-54. Upon receiving the command to switch to digital mode in step 610, control processor 405 switches to digital mode and immediately begins transmitting subsequent frames in digital mode in step 615. In the transition from analog mode to digital mode, the layer 2 protocol handles any missing or corrupted frames.

Figure 9:
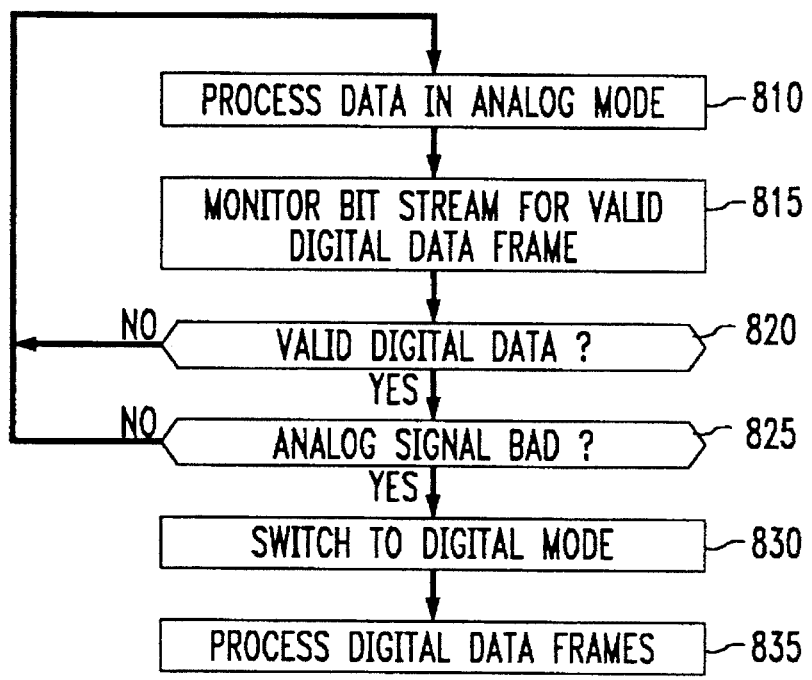
FIG. 9 is a flow diagram of an illustrative method for switching from analog to digital mode for use in a modem-pool modem.

FIG. 9 is an illustrative method for use in modem-pool modem 285 to switch from analog mode to digital mode. As described above, cellular radio modem 400 switches modes upon receiving notification by the cellular network to switch modes. As a result, modem-pool modem 285 needs some way of determining when cellular radio modem 400 switched modes. Therefore, and in accordance with the invention, modem-pool modem 285 simultaneously monitors the data signal on line 276 for both digital mode and analog mode. In particular, modem-pool modem 285 processes the data represented by the data signal in analog mode in step 810. However, modem-pool modem 285 also monitors the bit stream represented by this data signal for a valid digital data frame at the same time. If there is no valid digital data, modem-pool modem 285 continues to process the received data signal in analog mode in step 810. However, if there is valid digital data, modem-pool modem goes to step 825. The latter step allows modem-pool modem 285 to confirm that there was a switch from analog mode to digital modem by cellular radio modem 400. Modem-pool modem 285 evaluates the received data signal, from an analog point of view, to determine if the analog signal is, infact, bad. In other words, in a bad signal, there are uncorrectable errors in recovering data from the data signal in the analog mode, while in a good signal, there are either no errors or the errors are correctable. If modem-pool modem 285 evaluates the data signal as representing a good analog signal, then modem-pool modem continues to process the data signal in the analog mode. However, if modem-pool modem determines that the analog signal has deteriorated, then modem-pool modem 285 switches to digital mode in step 830 and processes the data signal as representing digital data frames in step 835.

Figure 8:
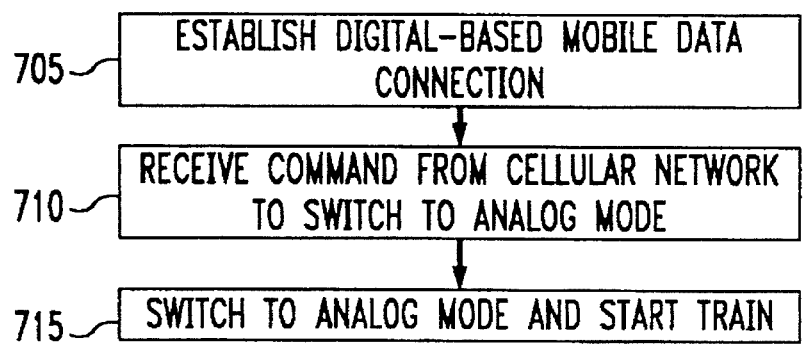
FIG. 8 is a flow diagram of an illustrative method for switching from digital to analog mode for use in the cellular radio modem of FIG. 5.

Once in digital mode, the mobile data user may move from the digit-based cell to an analog-based cell. An illustrative method for switching from digital mode to analog mode is shown in FIG. 8. Again, it is assumed that initially the mobile data connection is in digital mode in step 705. When the mobile data user moves from the digital-based cell to an analog-based cell, cellular radio modem 400 is notified to switch to analog mode in conformance with the above-mentioned standard IS-54. Upon receiving the command to switch to analog mode in step 710, control processor 405 instructs DSP processor 410 to switch to analog mode and send a standard training sequence to modem-pool modem 285 in step 715. For example, CCITT V.32bis signals AA or AC can be used. Signal AA is sent if cellular radio modem 400 is the answering modem, while signal AC is sent if cellular radio modem 400 is the originating modem. Cellular radio modem 400 continues to send this training sequence in step 720 until receiving an acknowledgment training sequence from modem-pool modem 285. In other words, cellular radio modem 400 is performating a modem handshaking sequence before sending any data.

Figure 7:
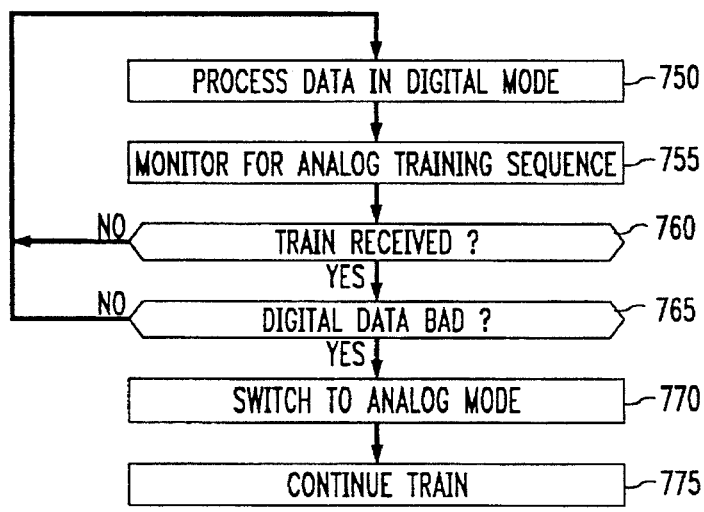
FIG. 7 is a flow diagram of an illustrative method for switching from digital to analog mode for use in a modem-pool modem.

A corresponding method for switching from digital to analog mode for use in modem-pool modem 285 is shown in FIG. 7. Modem-pool modem 285 processes the data signal in digital mode in step 750. As described above, modem-pool modem 285 simultaneously monitors the data signal in both a digital mode and an analog mode in step 755. It should be noted that modem-pool modem 285 receives a 64K PCM (pulse code modulated) signal on line 276. This PCM signal can represent either digital data or a PCM representation of analog data. In essence, the analog modem part of the dual-mode modem is monitoring the PCM signal stream for the training sequence. If the standard training sequence is not detected, modem-pool modem 285 continues to process the data signal in digital mode in step 750. However, upon detection of the standard training sequence, modem-pool modem 285 goes to step 765. The latter step allows modem-pool modem 285 to confirm that there was a switch from digital mode to analog modem by cellular radio modem 400. Modem-pool modem 285 evaluates the received data signal, from a data point of view, to determine if the digital data signal is, infact, bad. If modem-pool modem 285 evaluates the digital data signal as representing a good digital data signal, e.g., either no errors, or correctable errors, then modem-pool modem continues to process the data signal in the digital mode. However, if modem-pool modem determines that the digital data signal has deteriorated, then modem-pool modem 285 reverts to analog mode and responds with its training signal, AC or AA, in step 775. The training signal from the modem-pool modem again depends upon whether modem-pool modem 285 was the answering or originating modem, respectively. Once there is a positive acknowledgment from the modem-pool modem, cellular radio modem 400 continues the training sequence. It can be observed from FIG. 3 that since the cellular portion of the data connection is terminated between modem-pool 285 and cellular radio modem 400, a standard training sequence does not have to be used. For example, a modified V.32bis training sequence can be defined that does not train the echo canceller, e.g., use of the CCITT V.33 training sequence. This will result in a much faster retrain than a standard V.32bis training sequence. The layer 2 protocol (error control routine) handles any missing or corrupted data in the transition between analog mode and digital mode.

As can be seen from the above description, this invention allows a cellular modem to switch between analog and digital modes without dropping the data connection. This allows the modem's received data signal to be processed differently depending on the mode of operation. In addition, since the cellular modem's control processor is now performing compression and error control in both analog and digital modes, it is easy to continue the compression and error control while switching between the analog and digital modes of operation.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the above-described embodiment for the cellular radio modem automatically switches between analog and digital mode, this switching can also be performed in other ways. One example would be for the cellular radio modem to first transmit a command to the modem-pool modem to switch modes. Such a command could be a an escape sequence similar to that as defined in standard TR 30.4 to escape in and out of "data mode," or the remote loopback sequence defined in CCITT V.54 could be used as the unique codeword, or the simulated control carder LSD turn-off sequence defined in CCITT V.13. Further, the cellular radio modem could require an acknowledgment from the modem-pool modem before the cellular radio modem switches modes. Also, the notification to the far-end modem could be provided by by the cellular network.

In addition, although shown as one physical unit, the cellular modem and the mobile phone can be physically separate. This would result in the mobile phone being connected to the cellular modem via an equivalent line 401. However, the mobile phone would additionally have to notify the cellular modem, via the control bus, as to when the mobile phone received the instruction to switch modes from the cellular network.

I claim:

1. A method for use in a modem to maintain a data connection between a cellular-side of the data connection and a public-switched telephone side of the data connection, the method comprising the steps of:

operating the modem in a current mode of operation, wherein the current mode of operation is either a digital mode or an analog mode;

receiving in the modem a data signal from the cellular-side of the data connection;

monitoring the received data signal in the modem to determine a subsequent mode of operation for the modem, wherein the subsequent mode of operation is analog if the current mode of operation is digital and the subsequent mode of operation is digital if the current mode of operation is analog.

2. The method of claim 1 wherein the monitoring step includes the steps of:

monitoring the received data signal for a valid digital data frame when the current mode of operation is analog; and switching to the digital mode as the subsequent mode of operation upon detection of the valid digital data frame.

3. The method of claim 1 wherein the step of switching includes the steps of:

monitoring the received data signal for a valid digital data frame when the current mode of operation is analog;

evaluating the received data signal to determine an error rate of the received data signal; and switching to the digital mode as the subsequent mode of operation when the valid digital data frame is detected and the error rate is greater than a predefined value.

4. The method of claim 1 wherein the monitoring step includes the steps of:

monitoring the received data signal for an analog training sequence when the current mode of operation is digital; and switching to the analog mode as the subsequent mode of operation upon detection of the analog training signal.

5. The method of claim 1 wherein the step of switching includes the steps of:

monitoring the received data signal for an analog training sequence when the current mode of operation is digital;

evaluating the received data signal to determine an error rate of the received data signal; and switching to the analog mode as the subsequent mode of operation when the analog training signal is detected and the error rate is greater than a predefined value.

6. A cellular data communications system comprising:

a cellular modem for providing a data signal;

mobile cellular communications equipment for transmitting a cellular data signal representative of the data signal over a cellular channel;

a cell site transceiver for receiving and demodulating the cellular data signal and for providing a pulse code modulated signal representative of the data signal; and a modem that receives the pulse code modulated signal and processes the pulse code modulated signal in accordance with a current mode of operation, where the current mode of operation is either a digital mode or an analog mode;

wherein the modem sets the current mode of operation by evaluating the received pulse code modulated signal.

7. The apparatus of claim 6 wherein the modem sets the current mode of operation to digital upon detection of a valid digital data frame.

8. The apparatus of claim 6 wherein the modem sets the current mode of operation to digital upon detection of a valid digital data frame and upon determining that an error rate of the received pulse code modulated signal is greater than a predefined value.

9. The apparatus of claim 6 wherein the modem sets the current mode of operation to analog upon detection of an analog training signal.

10. The apparatus of claim 6 wherein the modem sets the current mode of operation to analog upon detection of an analog training signal and upon determining that an error rate of the received pulse code modulated signal is greater than a predefined value.

11. Cellular communications apparatus for maintaining a cellular data connection, the apparatus comprising:

a mobile transceiver for modulating a data signal for transmission over a cellular network during the cellular data connection and for providing a predefined mode signal from the cellular network;

a data communications interface circuit responsive to the predefined mode signal for switching between an analog mode of operation and a digital mode of operation without dropping the cellular data connection by cooperating with a far-end data communications interface circuit when switching between the analog mode and the digital mode;

wherein the data communications interface circuit provides the data signal in an analog form in the analog mode of operation and provides the data signal in a digital form in the digital mode of operation.

12. The apparatus of claim 11 wherein the data communications interface circuit cooperates with the far-end data communications when switching from the digital mode to the analog mode by exchanging a predefined training signal sequence.

* * * * *